US010165727B2

(12) United States Patent
Cigarini et al.

(10) Patent No.: US 10,165,727 B2
(45) Date of Patent: Jan. 1, 2019

(54) TRIMMER HEAD

(71) Applicant: TECOMEC S.R.L., Reggio Emilia (RE) (IT)

(72) Inventors: Enrico Cigarini, Reggio Emilia (IT); Salvatore Longo, Cadelbosco Sopra (IT)

(73) Assignee: TECOMEC S.R.L., Reggio Emilia (IT)

( * ) Notice: Subject to any disclaimer, the term of this patent is extended or adjusted under 35 U.S.C. 154(b) by 194 days.

(21) Appl. No.: 15/010,585

(22) Filed: Jan. 29, 2016

(65) Prior Publication Data
US 2016/0235001 A1  Aug. 18, 2016

(30) Foreign Application Priority Data
Feb. 16, 2015 (IT) .............................. MO2015A0028

(51) Int. Cl.
*A01D 34/416* (2006.01)

(52) U.S. Cl.
CPC ....... *A01D 34/416* (2013.01); *A01D 34/4162* (2013.01); *A01D 34/4166* (2013.01)

(58) Field of Classification Search
CPC ................ A01D 34/412; A01D 34/416; A01D 34/4161–34/4163; A01D 34/4165–34/4168; A01D 34/42; A01D 34/46; A01D 34/49; A01D 34/52; A01D 34/53; A01D 34/54; A01D 34/56–34/58; A01D 34/60; A01D 34/62
USPC ...................................... 30/276; 56/12.7, 17
See application file for complete search history.

(56) References Cited

U.S. PATENT DOCUMENTS

| 3,708,967 | A | * | 1/1973 | Geist | .................. | A01D 34/4161 56/12.7 |
| 4,035,912 | A | * | 7/1977 | Ballas | .................. | A01D 34/416 30/276 |
| 4,104,797 | A | * | 8/1978 | Ballas | ................ | A01D 34/4161 30/276 |
| 4,236,312 | A | * | 12/1980 | Foster | ................ | A01D 34/4162 30/276 |
| 4,290,200 | A | | 9/1981 | Lombard | | |
| 4,651,421 | A | * | 3/1987 | Zerrer | ................ | A01D 34/4162 56/12.7 |
| 4,813,140 | A | * | 3/1989 | Calcinai | ............. | A01D 34/4161 30/276 |

(Continued)

FOREIGN PATENT DOCUMENTS

| EP | 3056075 A1 * | 8/2016 |
| WO | 2013138752 A1 | 9/2013 |
| WO | 2013179318 A1 | 12/2013 |

*Primary Examiner* — Jason Daniel Prone
(74) *Attorney, Agent, or Firm* — Pearne & Gordon LLP

(57) ABSTRACT

A trimmer head that includes a casing to be coupled to a driveshaft. The casing includes an upper shell and a lower shell, with the lower shell including a second toothing that protrudes upwardly. The trimmer head further includes an upper disk and a lower disk within the casing, with the lower disk including a first toothing that protrudes downwardly. A spool of cutting wire is positioned between the lower disk and the upper disk. In an engagement position, the first toothing and the second toothing are engaged and the upper disk and lower disk rotate with the lower shell. In a free position, the first toothing and the second toothing are disengaged and the upper disk and lower disk rotate with respect to the lower shell.

7 Claims, 4 Drawing Sheets

(56) References Cited

U.S. PATENT DOCUMENTS

| | | | | |
|---|---|---|---|---|
| 4,823,465 A * | 4/1989 | Collins | A01D 34/4163 | 30/276 |
| 4,893,410 A * | 1/1990 | Hoffmann | A01D 34/416 | 30/276 |
| 4,959,904 A * | 10/1990 | Proulx | A01D 34/4163 | 30/276 |
| 5,036,648 A * | 8/1991 | Hoffmann | A01D 34/4162 | 30/DIG. 5 |
| 5,095,688 A * | 3/1992 | Fabrizio | A01D 34/4161 | 30/276 |
| 5,222,301 A * | 6/1993 | Sugihara | A01D 34/4161 | 30/276 |
| 5,293,691 A * | 3/1994 | Sugihara | A01D 34/4161 | 30/276 |
| 5,293,692 A * | 3/1994 | Sugihara | A01D 34/4161 | 30/276 |
| 5,295,306 A * | 3/1994 | Sugihara | A01D 34/4161 | 30/276 |
| 5,311,665 A * | 5/1994 | Sugihara | A01D 34/4162 | 30/276 |
| 5,339,526 A * | 8/1994 | Everts | A01D 34/4165 | 30/276 |
| 5,345,683 A * | 9/1994 | Kanou | A01D 34/4163 | 30/276 |
| 5,522,140 A * | 6/1996 | Sugihara | A01D 34/4161 | 30/276 |
| 5,522,141 A * | 6/1996 | Sugihara | A01D 34/4161 | 30/276 |
| 5,526,572 A * | 6/1996 | Sugihara | A01D 34/4161 | 30/276 |
| 5,758,424 A * | 6/1998 | Iacona | A01D 34/4166 | 30/276 |
| 5,765,287 A * | 6/1998 | Griffini | A01D 34/4163 | 30/276 |
| 6,263,580 B1 * | 7/2001 | Stark | A01D 34/4163 | 30/276 |
| 6,279,235 B1 * | 8/2001 | White, III | A01D 34/416 | 30/276 |
| 6,418,627 B1 * | 7/2002 | Tsunoda | A01D 34/4163 | 30/276 |
| 6,519,857 B1 * | 2/2003 | Proulx | A01D 34/416 | 30/276 |
| 6,581,292 B2 * | 6/2003 | Allis | A01D 34/4166 | 30/276 |
| 6,594,907 B2 * | 7/2003 | Wilson | A01D 34/4162 | 30/276 |
| 7,412,768 B2 * | 8/2008 | Alliss | A01D 34/4163 | 30/276 |
| 8,061,042 B2 * | 11/2011 | Arnetoli | A01D 34/4166 | 30/276 |
| D653,920 S * | 2/2012 | Cigarini | D8/8 | |
| 8,689,451 B2 * | 4/2014 | Cigarini | A01D 34/416 | 30/276 |
| D715,608 S * | 10/2014 | Cigarini | D8/8 | |
| D763,640 S * | 8/2016 | Cigarini | D8/8 | |
| 9,635,808 B2 * | 5/2017 | Longo | A01D 34/416 | 30/276 |
| D789,166 S * | 6/2017 | Cigarini | D8/8 | |
| D789,167 S * | 6/2017 | Cigarini | D8/8 | |
| D789,168 S * | 6/2017 | Cigarini | D8/8 | |
| 9,750,181 B2 * | 9/2017 | Cigarini | A01D 34/4166 | 30/276 |
| 2002/0073556 A1 * | 6/2002 | Fogle | A01D 34/416 | 30/276 |
| 2005/0223566 A1 * | 10/2005 | Sullivan | A01D 34/63 | 30/276 |
| 2006/0254061 A1 * | 11/2006 | Alliss | A01D 34/4161 | 30/276 |
| 2008/0053052 A1 * | 3/2008 | Cigarini | A01D 34/4163 | 56/12.7 |
| 2011/0005185 A1 | 1/2011 | Kato et al. | | |
| 2011/0302793 A1 | 12/2011 | Alliss | | |
| 2012/0126051 A1 * | 5/2012 | Legrand | A01D 34/4168 | 428/162 |
| 2012/0131805 A1 | 5/2012 | Kato et al. | | |
| 2012/0219761 A1 * | 8/2012 | Legrand | A01D 34/4168 | 428/162 |
| 2013/0283623 A1 * | 10/2013 | Pellenc | A01D 34/416 | 30/276 |
| 2014/0053416 A1 * | 2/2014 | Proulx | A01D 34/4167 | 30/347 |
| 2015/0101199 A1 | 4/2015 | Cigarini | | |
| 2015/0230401 A1 * | 8/2015 | Legrand | A01D 34/4161 | 30/276 |
| 2015/0282425 A1 * | 10/2015 | Skinner | A01D 34/4166 | 30/276 |
| 2015/0327436 A1 | 11/2015 | Skinner et al. | | |
| 2016/0106032 A1 * | 4/2016 | Cigarini | A01D 34/4163 | 30/276 |
| 2016/0106033 A1 * | 4/2016 | Longo | A01D 34/416 | 30/276 |
| 2016/0106034 A1 * | 4/2016 | Arnetoli | A01D 34/4166 | 30/276 |

* cited by examiner

TRIMMER HEAD

FIELD OF THE INVENTION

The present invention is related to a trimmer head.

The invention particularly relates to a head provided with an automatic cutting wire unwinding device.

BACKGROUND OF THE INVENTION

Several examples of heads of this type are currently available on the market. These heads comprise a casing internally of which a winding-reel is housed for winding a wire cutting spool. Two portions of the cutting wire protrude outwardly through dedicated openings in the casing. The winding-reel is associated to the casing and can take on an engagement position, wherein it is rotatingly solid with the casing, and a free position, wherein it can rotate with respect to the casing. Notoriously, the free position of the winding-reel is exploited to cause unwinding of the wire spool with the purpose of restoring the length of the cutting wire portions which protrude outward of the casing. The automatic cutting wire unwinding device allows the winding-reel to move between the engagement position and the free position without being necessary to stop the trimmer head and perform manual operations.

The activation of the automatic unwinding device exploits the rotational speed variation of the head resulting from the shortening, due to wear, of the wire portions which protrude outward of the casing. The shortening of such portions reduces the moment of inertia of the head, which consequently increases its rotational speed. The automatic cutting wire unwinding device is activated as a result of the increased centrifugal force acting on one or more masses suitably placed inside the head. The activation of the unwinding device causes a lengthening of the protruding wire portions and an increase of the moment of inertia of the head. Hence, the head slows down, thereby reducing the force of inertia acting on the masses which cease to activate the unwinding device.

The heads currently available therefore provide use of a winding-reel whereon the cutting wire is wound. Once the cutting wire is used up, a new cutting wire needs to be wound onto the reel in order that the terminated spool can be restored. This operation, which is carried out without the head having to be disassembled, is rather long in that a manual rotation of the winding-reel is required until complete winding of the fresh spool thereon.

An example of a head currently available is described in WO2013/179318.

SUMMARY OF THE INVENTION

It is an object of the present invention to provide a trimmer head that overcomes the drawbacks of the heads available at present.

One advantage of the trimmer head is that replacement operations of the cutting wire spool are simplified and speeded up.

Another advantage of the trimmer head is that it is particularly lightweight and compact.

BRIEF DESCRIPTION OF THE DRAWINGS

Further characteristics and advantages of the present invention will better emerge from the detailed description that follows of a preferred embodiment of the invention illustrated by way of non-limiting example in the appended figures wherein.

DETAILED DESCRIPTION OF PREFERRED EMBODIMENTS OF THE INVENTION

Figure 1:
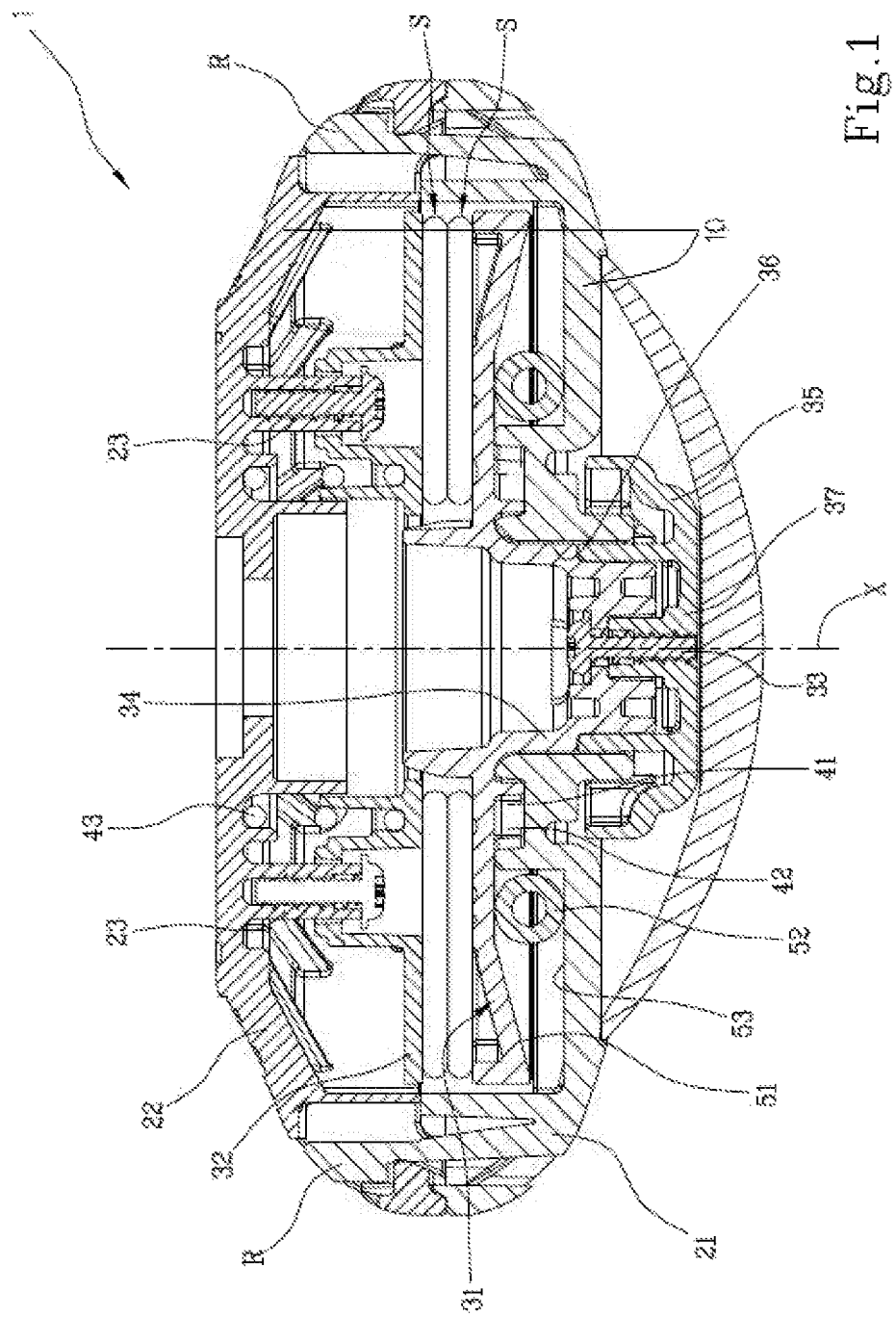
FIG. 1 shows a sectional view of the trimmer head illustrated on a plane containing the main rotational axis (X) of the trimmer head.
Figure 2:
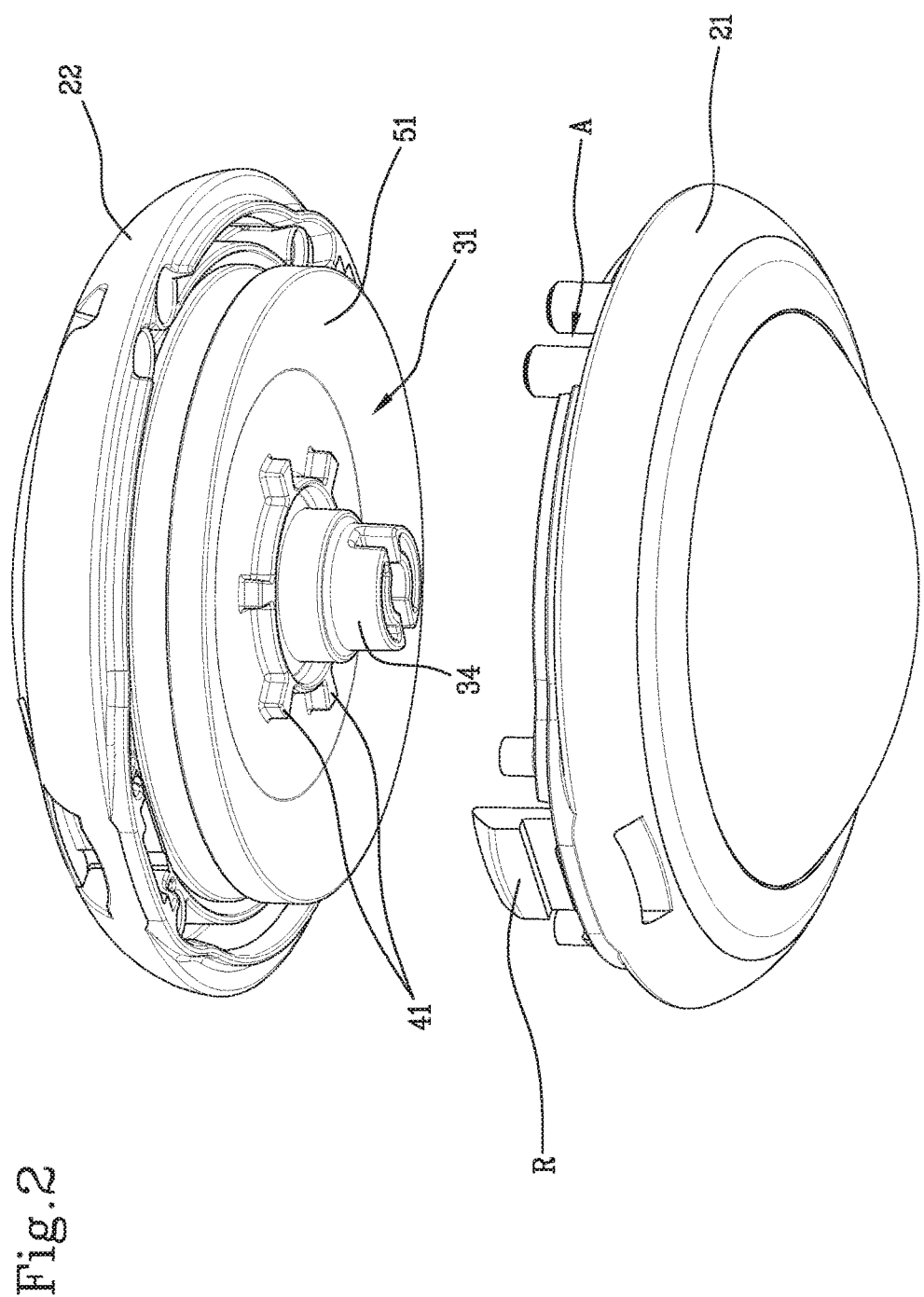
FIG. 2 shows a first exploded axonometric view of the trimmer head.
Figure 3:
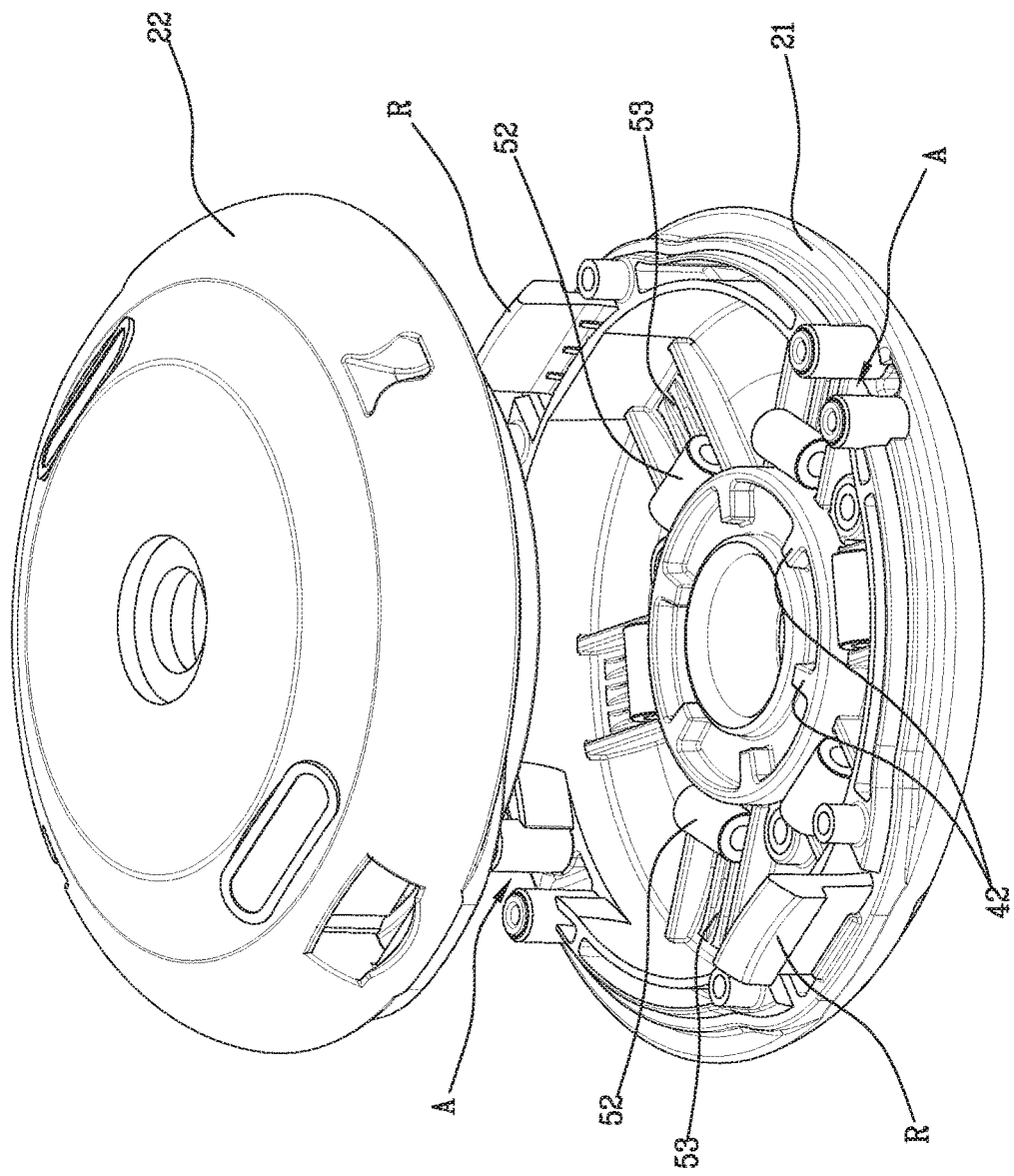
FIG. 3 shows a second exploded axonometric view of the trimmer head.
Figure 4:
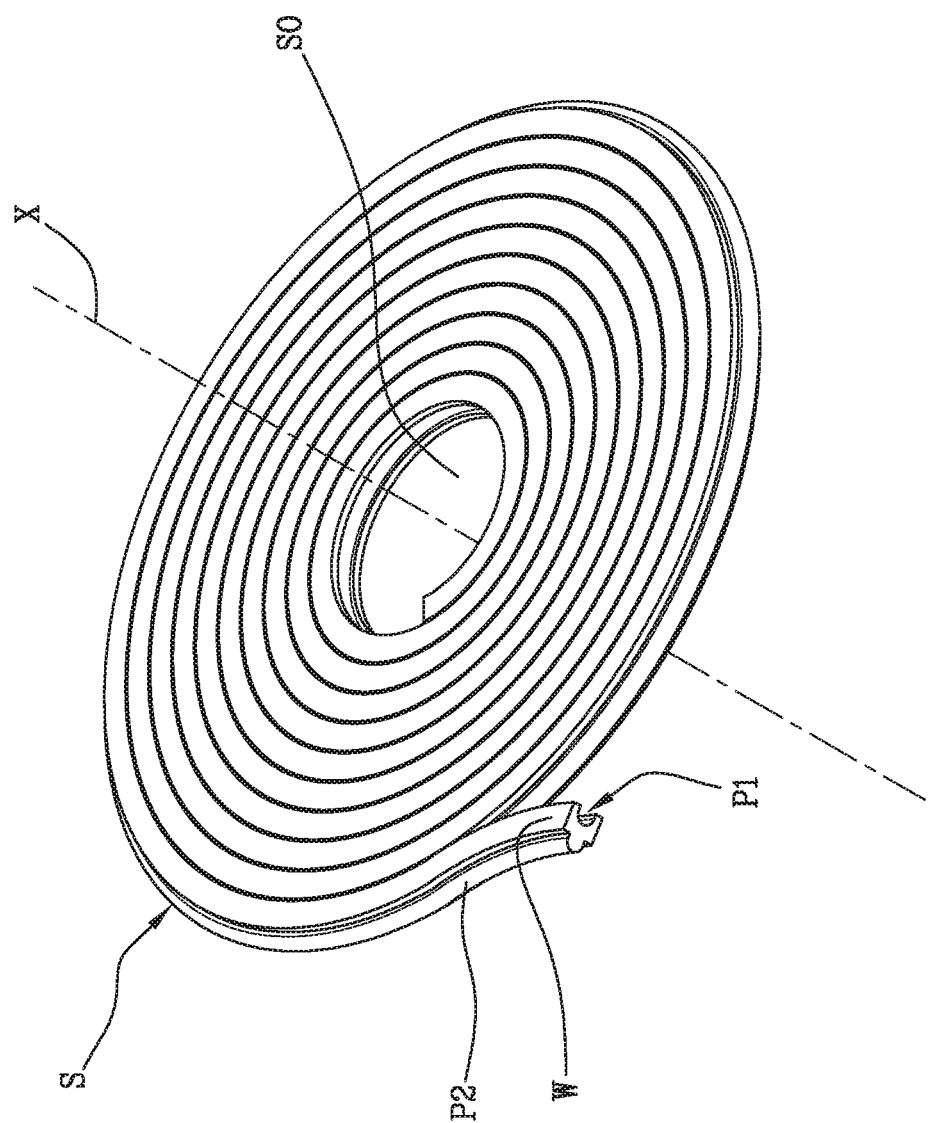
FIG. 4 shows an axonometric view of a cutting wire which may be used in the trimmer head of the present invention.

The trimmer head (1) according to the present invention comprises a casing (10), designed to be coupled to a driveshaft for rotating about a main axis (X), the casing (10) comprising an upper shell (22) and a lower shell (21), the lower shell (21) comprising a second toothing (42) that protrudes upwardly and a track (53) that is oriented radially with respect to the main axis (X). The casing (10) is provided with one or more openings (A) in order to afford passage of respective end portions of the cutting wire (W). A cutting wire spool (S) is housed inside the casing (10) between a lower disk (31) and an upper disk (32). The lower disk (31) includes a first toothing (41) that protrudes downwardly. In an engagement position, the upper disk (32) and the lower disk (31) rotate with the lower shell (21). In a free position, the upper disk (32) and the lower disk (31) rotate with respect to the lower shell (21). This relative rotation is aimed at causing unwinding of a given portion of the cutting wire (W) so that the portions that became detached during use can be restored.

In a preferred embodiment, a toothed profile is interposed between the lower disk (31) and the lower shell (21). In particular, the toothed profile comprises a first toothing (41), which is integral with the lower disk (31), and a second toothing (42), which is integral with the lower shell (21). In the engaged position the two toothings (41, 42) are mutually engaged, thereby making the lower shell (21) and the lower disk (31) engaged with one another. In the free position the two toothings (41, 42) do not interact with each other.

In the preferred embodiment, the first toothing (41) protrudes downwardly of the lower disk (31), while the second toothing (42) protrudes upwardly from the lower shell (21), frontally to the first toothing (41). The lower disk (31) is movable along the main axis (X) between the engaged position and the free position thereof.

A spring (43) is configured for displacement of the lower disk (31) from the free position to the engagement position. In the preferred embodiment the spring (43) is configured to urge the lower disk (31) towards the engagement position. The spring (43) is particularly interposed between the upper shell (22) and the upper disk (32). The spring (43) is compressed such that the lower disk (31) is urged downwards.

A mass (52) is disposed between the lower shell (21) and the lower disk (31) for moving the lower disk (31) from the engagement position to the free position. The mass (52) is configured to move under the effect of the centrifugal force due to rotation of the head (1).

The mass (52) is arranged within in an eccentric position with respect to the main axis (X) and movable along at least a radial direction with respect to the main axis (X) owing to the centrifugal force. The mass (52) is predisposed for interacting with the lower disk (31) and for displacing it from the engagement position towards the free position due to the radial movement of the mass (52) away from the main axis (X).

In the preferred embodiment of the head (1), the mass (52) is slidable along a track (53) which is oriented radially with respect to the main axis (X). Each track (53) is disposed on the lower shell (21).

An inclined surface (51) of the lower disk (31) is in contact with the mass (52). The mass (52) is interposed between the inclined surface (51) and the lower shell (21). The inclined surface (51) exhibits a descending inclination while proceeding away from the main axis (X), so that the lower disk (31) tends to be pushed upwards by the masses (52), which slide away from the main axis (X) owing to the centrifugal force. In this way, as the cutting wire (W) becomes consumed and the moment of inertia of the head (1) is reduced, the rotational speed of the head (1) is increased, and together with it the centrifugal force acting on the masses (52), whose thrust on the lower disk (31), when the head (1) exceeds a certain rotational speed, exceeds the downward thrust exerted by the spring (43). In such conditions, the lower disk (31) moves upwards until the free position is reached, wherein it can rotate with respect to the lower shell (21) thereby providing to unwind the cutting wire (W) progressively. This causes an increase of the moment of inertia of the head (1) which slows down to the point where the centrifugal force acting on the masses (52) is no longer sufficient to overcome the thrust of the spring (43). In such conditions, the lower disk (31) returns downwards to the engagement position.

The inclined surface (51) is located on a surface of the lower disk (31), between the outer edge and an intermediate portion of the lower disk (31). Also the first toothing (41) protrudes downwards to the lower shell (21).

An upper disk (32) is disposed opposite to the lower disk (31). In particular, the upper disk (32) is arranged above the lower disk (31) at a certain distance therefrom so as to delimit a housing for a cutting wire spool (S). The upper disk (32) is movable relative to the casing (10) along the main axis (X). The spring (43) is interposed between the upper shell (22) and the upper disk (32). In this way the spring (43) operates on the lower disk (31) through the upper disk (32) and the cutting wire spool (S) housed between the lower disk (31) and the upper disk (32).

The lower disk (31) and the upper disk (32) are mutually independent. In particular, each of them is movable along the main axis (X) independently from the other. The fact that the disks (31, 32) are independent from one another, allows use of a spool (S) of the cutting wire (W) coiled up into a flat spiral. The spool (S) is compressed between the two disks (31, 32), thus remaining steadily in a flat configuration. This type of spool (S), wherein the loops of wire are placed alongside and substantially intersected by a same median plane being perpendicular to the main axis (X), is particularly compact and lightweight and can be swiftly replaced.

The lower disk (31) is provided with a central pin (33) which protrudes upwards concentrically to the main axis (X) and is intended to be inserted into a central opening (SO) of the spool (S) which is delimited by the innermost loop. The central pin (33) is provided externally with engagements, not shown in detail, intended to come into contact with the innermost wire loop of the spool (S), in order that the wire spool (S) and the lower disk (31) become solidly constrained with one another with respect to the rotation about the main axis (X).

The cutting wire (W) preferably exhibits an inner engagement portion (P1) disposed longitudinally on an inner side of the wire loops and an external engagement portion (P2) arranged longitudinally on an outer side of the wire loops. Such engagement portions (P1, P2) are predisposed for engaging each other at the adjacent loops, so that the spool (S) is maintained combined in the flat configuration. The central pin (33) of the lower disk (31) is inserted into the central opening (SO) of the spool (W), so that the inner engagement portion (P1) becomes tightened in contact with the central pin (33). Preferably, the inner engagement portion (P1) is in the form of a longitudinal groove, whereas the external engagement portion (P2) is in the form of a longitudinal projecting rib, which is counter-shaped to the longitudinal groove (P1).

Two or more spools (S) overlapping one another along the main axis (X) may be arranged between the lower disk (31) and the upper disc (32).

Advantageously, the casing (10) comprises a lower shell (21) and an upper shell (22) being separable from one another. A rapid coupling and detachment device (R), for example with snap coupling, can be interposed between the two shells (21, 22) for easy detachment and coupling thereof. The lower shell (21) and the lower disk (31) are constrained to one another so that the lower disk (31) can not be separated completely from the lower shell (21). To this end the lower shell (21) is provided with a central through opening (36). The lower disk (31) has a hub (34), which is concentric to the main axis (X), which is rotatably and slidably arranged through the central opening (36). An abutment element (35) is associated with the end of the hub (34). Such abutment element (35) exhibits a head (37) which is disposed outside the central opening (36), whose diameter is greater than the internal diameter of the central opening (36). The overall extension of the hub (34) and the abutment element (35) along the main axis (X) is such as to enable displacement of the lower disk (31) between the engagement position and the free position.

Preferably also the upper shell (22) and the upper disk (32) are constrained to one another so that the upper disk (32) cannot be separated completely from the upper shell (22). In particular the upper disk (32) is secured to the upper shell (22) via two pins (23) which extend parallel to the main axis (X) from a bottom surface of the upper shell (22). The pins (23) are passing through holes which are afforded in the upper disk (32), so that the upper disk (32) can slide parallel to the main axis (X) with respect to the upper shell (22). Owing to the presence of screws or the like placed at the end of the pins (23), the upper disk (32) is prevented from slipping off completely.

During rotation of the head (1), in the free position of the lower disk (31) a relative rotation between the lower disk (31) and the upper disk (32) is thus produced, in that the latter remains solidly constrained in rotation to the lower shell (21). This relative rotation promotes easy unwinding of the cutting wire (W), in that it makes easier the separation between the loops of the spool.

Owing to the presence of the disks (31, 32) being mutually independent, replacement of the spool of wire occurs in an extremely quick and easy manner. In order that a new spool of wire is positioned on the lower disk (31), it is indeed sufficient to separate the two shells (21, 22).

The invention claimed is:
1. A trimmer head comprising:
a casing designed to be coupled to a driveshaft for rotating about a main axis, the casing comprising an upper shell and a lower shell, the lower shell comprising a second toothing that protrudes upwardly and a track that is oriented radially with respect to the main axis;
an upper disk secured to the upper shell;
a lower disk comprising a first toothing that protrudes downwardly;
at least one spool of cutting wire between the lower disk and the upper disk;
a spring disposed between the upper shell and the upper disk; and
a mass disposed between the lower shell and the lower disk configured to move in a radial direction within the track with respect to the main axis
wherein in an engagement position, the spring urges the upper disk and the lower disk towards the lower shell, such that the first toothing and the second toothing are engaged and the upper disk and lower disk rotate with the lower shell,
wherein in a free position, the mass moves in the track radially away from the main axis to push the lower disk away from the lower shell and disengage the first toothing and the second toothing such that the upper disk and lower disk rotate with respect to the lower shell,
wherein the lower disk and the upper disk are independent of one another and are within the lower shell.

2. The trimmer head according to claim 1, in which the lower shell comprises a central through opening and the lower disk comprises a hub that is rotatably and slidably arranged through the central opening, wherein the hub comprises a head positioned on one end of the hub, wherein a diameter of the head is greater than an internal diameter of the central opening, so that the lower disk cannot be separated completely from the lower shell.

3. The trimmer head according to claim 1, wherein the upper disk is slidably secured to the upper shell via a pin so that the upper disk cannot be separated completely from the upper shell.

4. The trimmer head according to claim 1, wherein the mass engages an inclined surface of the lower disk as it moves radially from the main axis.

5. The trimmer head according to claim 1, where the at least one spool of cutting wire is coiled up into a flat spiral and compressed between the upper and lower disks.

6. The trimmer head according to claim 5, wherein the cutting wire has an inner engagement portion disposed longitudinally on an inner side; the lower disk comprising a central pin that protrudes upwards concentrically to the main axis for insertion into a central opening of the spool so that the inner engagement portion contacts the central pin.

7. The trimmer head according to claim 5 wherein the at least one spool of cutting wire is two or more spools of cutting wire which are overlapping one another along the main axis.

* * * * *